(12) United States Patent
Ushigami et al.

(10) Patent No.: US 12,525,384 B2
(45) Date of Patent: Jan. 13, 2026

(54) WOUND CORE

(71) Applicant: NIPPON STEEL CORPORATION, Tokyo (JP)

(72) Inventors: Yoshiyuki Ushigami, Tokyo (JP); Shinji Yamamoto, Tokyo (JP); Takeo Aramaki, Tokyo (JP); Yuki Kunita, Tokyo (JP); Satoshi Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 351 days.

(21) Appl. No.: 18/033,090

(22) PCT Filed: Oct. 26, 2021

(86) PCT No.: PCT/JP2021/039553
§ 371 (c)(1),
(2) Date: Apr. 21, 2023

(87) PCT Pub. No.: WO2022/092116
PCT Pub. Date: May 5, 2022

(65) Prior Publication Data
US 2023/0402220 A1  Dec. 14, 2023

(30) Foreign Application Priority Data

Oct. 26, 2020  (JP) ................. 2020-178900

(51) Int. Cl.
| | |
|---|---|
| *C22C 38/02* | (2006.01) |
| *H01F 1/147* | (2006.01) |
| *H01F 3/02* | (2006.01) |
| *H01F 27/245* | (2006.01) |
| *H01F 41/02* | (2006.01) |
| *C21D 1/26* | (2006.01) |
| *C21D 1/76* | (2006.01) |
| *C21D 3/04* | (2006.01) |
| *C21D 6/00* | (2006.01) |
| *C21D 8/12* | (2006.01) |
| *C21D 9/46* | (2006.01) |
| *C22C 38/00* | (2006.01) |
| *C22C 38/04* | (2006.01) |
| *C22C 38/06* | (2006.01) |
| *C22C 38/12* | (2006.01) |
| *C22C 38/34* | (2006.01) |

(52) U.S. Cl.
CPC ......... *H01F 27/2455* (2013.01); *C22C 38/02* (2013.01); *H01F 1/147* (2013.01); *H01F 1/14775* (2013.01); *H01F 1/14783* (2013.01); *H01F 3/02* (2013.01); *H01F 41/024* (2013.01); *C21D 1/26* (2013.01); *C21D 1/76* (2013.01); *C21D 3/04* (2013.01); *C21D 6/008* (2013.01); *C21D 8/12* (2013.01); *C21D 8/1222* (2013.01); *C21D 8/1233* (2013.01); *C21D 8/1255* (2013.01); *C21D 8/1261* (2013.01); *C21D 8/1272* (2013.01); *C21D 8/1283* (2013.01); *C21D 8/1294* (2013.01); *C21D 9/46* (2013.01); *C21D 2201/05* (2013.01); *C22C 38/002* (2013.01); *C22C 38/004* (2013.01); *C22C 38/008* (2013.01); *C22C 38/04* (2013.01); *C22C 38/06* (2013.01); *C22C 38/12* (2013.01); *C22C 38/34* (2013.01)

(58) Field of Classification Search
CPC ............................. C22C 38/02; H01F 1/147
See application file for complete search history.

(56) References Cited

U.S. PATENT DOCUMENTS

| | | | |
|---|---|---|---|
| 2003/0180553 A1 | 9/2003 | Shigesato et al. | |
| 2013/0213525 A1 | 8/2013 | Shingaki et al. | |
| 2020/0126709 A1* | 4/2020 | Mizumura | ............ H01F 1/147 |
| 2022/0106658 A1 | 4/2022 | Ushigami et al. | |

FOREIGN PATENT DOCUMENTS

| | | |
|---|---|---|
| AU | 2012337260 A1 | 5/2014 |
| EP | 3 101 667 A1 | 12/2016 |
| EP | 3 570 305 A1 | 11/2019 |
| JP | 2001-192785 A | 7/2001 |
| JP | 2002-322566 A | 11/2002 |
| JP | 2005-240079 A | 9/2005 |
| JP | 2005-264236 A | 9/2005 |
| JP | 2005-286169 A | 10/2005 |
| JP | 4025514 B2 | 12/2007 |
| JP | 2012-52229 A | 3/2012 |
| JP | 6224468 B2 | 11/2017 |
| JP | 2018-148036 A | 9/2018 |
| JP | 2019-19360 A | 2/2019 |
| WO | WO 2013/074268 A1 | 5/2013 |
| WO | WO 2020/149319 A1 | 7/2020 |

\* cited by examiner

*Primary Examiner* — Jophy S. Koshy
(74) *Attorney, Agent, or Firm* — Birch, Stewart, Kolasch & Birch, LLP

(57) ABSTRACT

This wound core is a wound core including: a substantially rectangular wound core main body in a side view in which first planar portions and corner portions are alternately continuous and at least one of two or more bent portions existing in at least one corner portion satisfies Equations (1) to (3) below.

$Tave \leq 40$ nm  (1)

$(To-Tu)/Tave \leq 0.50$  (2)

$Tave(To-Tu) \leq 240$ nm$^2$  (3)

4 Claims, 7 Drawing Sheets

WOUND CORE

TECHNICAL FIELD

The present invention relates to a wound core. Priority is claimed on Japanese Patent Application No. 2020-178900, filed Oct. 26, 2020, the content of which is incorporated herein by reference.

BACKGROUND ART

A grain-oriented electrical steel sheet is a steel sheet containing 7 mass % or less of Si and has a secondary recrystallization texture in which secondary recrystallization grains are concentrated in the {110}<001> orientation (Goss orientation). Magnetic properties of grain-oriented electrical steel sheets are greatly affected by the degree of concentration in the {110}<001> orientation. In recent years, grain-oriented electrical steel sheets that have been put into practical use, the angle between the crystal <001> direction and the rolling direction is controlled to fall within a range of about 5°.

Grain-oriented electrical steel sheets are laminated and used in iron cores of transformers or the like and require high magnetic flux density and low iron loss as the main magnetic properties. Crystal orientation is known to have a strong correlation with these properties, and for example, Patent Documents 1 to 3 disclose precise orientation control techniques.

A film is formed on the surface of a steel sheet to reduce iron loss. This film is used to reduce iron loss of a single steel sheet by applying tension to the steel sheet and also to reduce iron loss of an iron core by ensuring electrical insulation properties between steel sheets when the steel sheets are laminated and used.

As a grain-oriented electrical steel sheet in which a film is formed on the surface of the steel sheet, for example, there is a grain-oriented electrical steel sheet in which an intermediate layer (primary film) mainly composed of forsterite ($Mg_2SiO_4$) is formed on the surface of a base steel sheet and an insulating coating is formed on the surface of the intermediate layer.

This adhesion is mainly ensured by an anchoring effect due to unevenness of the interface between the base steel sheet and the intermediate layer. The unevenness of the interface interferes with domain wall motion when the electrical steel sheet is magnetized, thereby hindering the effect of reducing iron loss. Techniques such as Patent Documents 4 to 7 have been disclosed in which adhesion of an insulating coating is ensured using a special intermediate layer of several nanometers to several tens of nanometers which is made of $SiO_2$, TiN, or the like in a state in which the above interface is smoothed to reduce iron loss without existence of a finish-annealed film.

In addition, in the related art, for wound core production as described in, for example, Patent Document 8, a method of winding steel sheets into a cylindrical shape, then pressing the cylindrical laminated body without change so that corner portions thereof have a constant curvature, forming it into a substantially rectangular shape, then performing annealing to remove strain and maintain the shape is widely known.

On the other hand, as other methods of producing a wound core, techniques such as those in Patent Documents 9 to 11 have been disclosed in which steel sheet portions that will be corner portions of a wound core are bent in advance so that a relatively small bending area with a radius of curvature of 3 mm or less is formed, and the bent steel sheets are laminated to form a wound core. According to these production methods, a conventional large-scale pressing process is not required, the steel sheets are precisely bent to maintain the shape of an iron core, and processing strain is also concentrated at only the bent portions (corner portions). Therefore, it is also possible to omit the removal of strain through the above annealing process, industrial advantages are great, and application thereof is progressing.

CITATION LIST

Patent Documents

[Patent Document 1]
Japanese Unexamined Patent Application, First Publication No. 2001-192785
[Patent Document 2]
Japanese Unexamined Patent Application, First Publication No. 2005-240079
[Patent Document 3]
Japanese Unexamined Patent Application, First Publication No. 2012-052229
[Patent Document 4]
Japanese Patent No. 4025514
[Patent Document 5]
Japanese Unexamined Patent Application, First Publication No. 2002-322566
[Patent Document 6]
Japanese Unexamined Patent Application, First Publication No. 2019-019360
[Patent Document 7]
Japanese Unexamined Patent Application, First Publication No. 2005-264236
[Patent Document 8]
Japanese Unexamined Patent Application, First Publication No. 2005-286169
[Patent Document 9]
Japanese Patent No. 6224468
[Patent Document 10]
Japanese Unexamined Patent Application, First Publication No. 2018-148036
[Patent Document 11]
Australian Patent Application, Publication No. 2012337260

SUMMARY OF THE INVENTION

Problems to be Solved by the Invention

The present inventors have studied in detail the efficiency of a transformer iron core produced through a method of bending steel sheets in advance so as to form a relatively small bent region with a radius of curvature of 5 mm or less and laminating the bent steel sheets to form a wound core. As a result, it has been recognized that, even if steel sheets with substantially the same crystal orientation control and substantially the same iron loss and magnetic flux density measured on a single sheet are used as materials, there may be a difference in efficiency of iron cores.

When investigating the cause of this problem, it has been found that the degree of the phenomenon of the problem of the difference in efficiency also varies depending on the dimensions and shapes of the iron core. Comparing the difference in efficiency between steel types, the influence of the type of intermediate layer, especially the thickness and form of an intermediate layer, can be confirmed. When examining this phenomenon in more detail, the form of an intermediate layer changes the degree of inhibition of magnetization due to bending at bent portions, and therefore it is assumed that this causes a difference in the degree of iron loss deterioration of steel sheets including bent portions.

In this regard, various steel sheet production conditions and the shapes of iron cores have been studied and their influences on iron core efficiency have been classified. As a result, it has been found that the form of an intermediate layer of a material can be controlled optimally to achieve a suitable efficiency for an iron core which is appropriate for magnetic properties of a steel sheet material.

The present invention has been made in consideration of the above problem, and an object of the present invention is to provide a wound core which is produced through a method of bending steel sheets in advance so as to form a relatively small bent region with a radius of curvature of 5 mm or less and laminating the bent steel sheets to form a wound core and improved such that inadvertent deterioration in efficiency is minimized.

Means for Solving the Problem

In order to achieve the object, the present invention provides a wound core including: a substantially rectangular wound core main body in a side view, in which the wound core main body includes a portion in which grain-oriented electrical steel sheets in which first planar portions and corner portions are alternately continuous in a longitudinal direction and an angle, formed by two first planar portions adjacent to each other with each of the corner portions therebetween is 90° are stacked in a sheet thickness direction and has a substantially rectangular laminated structure in a side view, each of the corner portions has two or more bent portions having a curved shape in a side view of the grain-oriented electrical steel sheets and a second planar portion between the adjacent bent portions, and the sum of bent angles of the bent portions existing in one corner portion is 90°, each bent portion in a side view has an inner side radius of curvature r of 1 mm to 5 mm, the grain-oriented electrical steel sheets have a chemical composition containing, in mass %, Si: 2.0% to 7.0%, with the remainder being Fe and impurities and have a texture oriented in the Goss orientation, and at least one of two or more bent portions existing in at least one corner portion satisfies Equations (1) to (3) below.

$$Tave \leq 40 \text{ nm} \tag{1}$$

$$(To-Tu)/Tave \leq 0.50 \tag{2}$$

$$Tave(To-Tu) \leq 240 \text{ nm}^2 \tag{3}$$

Here, a thickness T (nm) of an intermediate layer provided on a surface of a base steel sheet of the grain-oriented electrical steel sheets is measured at multiple sites of the first and second planar portion regions adjacent to the bent portions, an average thickness of the thickness T (nm) of the intermediate layer is regarded as Tave (un), a maximum thickness is regarded as Tmax (nm), a minimum thickness is regarded as Tmin (nm), an average value of data where T>Tave is regarded as To (nm), and an average value of data where T<Tave is regarded as Tu (nm).

In addition, in the configuration of the present invention, at least one of two or more bent portions existing in at least one corner portion may satisfy equation (4) below.

$$N(To-Tu) \leq 24 \text{ nm} \tag{4}$$

Here, in a thickness distribution of the intermediate layer along a surface direction of the steel sheets, a region where measurement values where T>Tave are continuous is counted as one region, and the number of these regions within the entire measurement region is defined as N.

In addition, in the configuration of the present invention, at least one of two or more bent portions existing in at least one corner portion may satisfy equation (5) below.

$$N \geq 2 \tag{5}$$

In addition, in the configuration of the present invention, at least one of two or more bent portions existing in at least one corner portion may satisfy equation (6) below.

$$(Tmax-Tmin) < Tave \tag{6}$$

Effects of the Invention

According to the present invention, it is possible to effectively minimize inadvertent deterioration in efficiency in a wound core formed by laminating bent steel sheets.

EMBODIMENTS FOR IMPLEMENTING THE INVENTION

Figure 1:
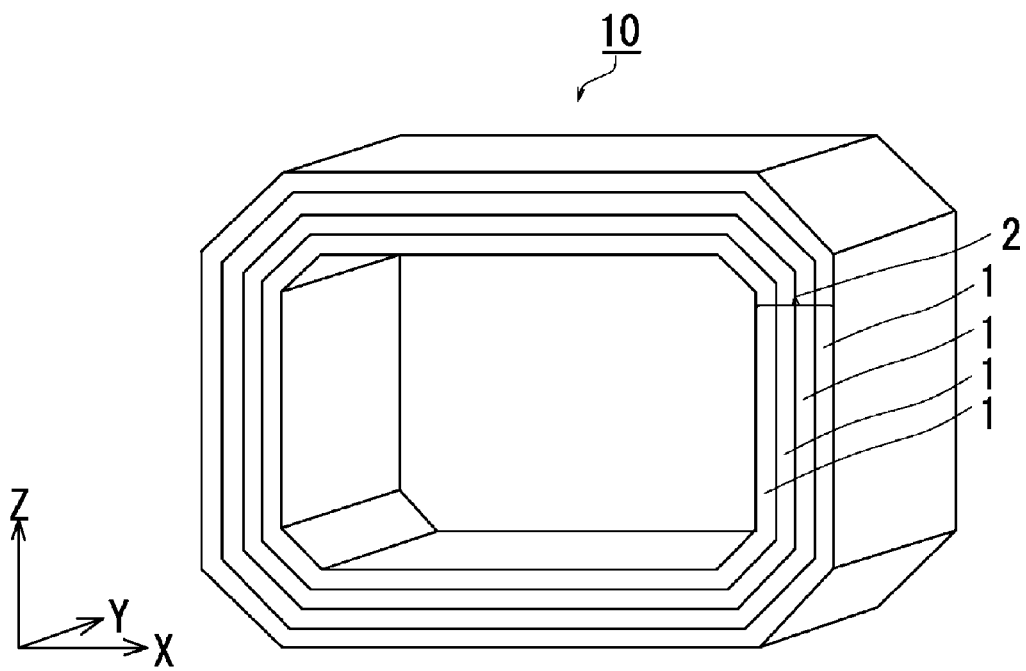
FIG. 1 is a perspective view schematically showing one embodiment of a wound core according to the present invention.

Hereinafter, wound cores according to the present invention will be sequentially described in detail. However, the present invention is not limited to the configurations disclosed in these embodiments, and can be variously modified without departing from the gist of the present invention. A lower limit value and an upper limit value are included in a numerical limit range described below. A numerical value represented by "more than" or "less than" is not included in the numerical range. In addition, "%" relating to chemical composition means "mass %" unless otherwise specified.

In addition, for example, terms such as "parallel," "perpendicular," "identical," and "right angle" and length and angle values used in this specification to specify shapes, geometric conditions and their extents are not bound by strict meanings, and should be interpreted to include the extent to which similar functions can be expected.

In addition, "grain-oriented electrical steel sheet" in the this specification is sometimes simply described as "steel sheet" or "electrical steel sheet," and "wound core" is sometimes simply described as "iron core."

A wound core according to the present embodiment is a wound core including: a substantially rectangular wound core main body in a side view, in which the wound core main body includes a portion in which grain-oriented electrical steel sheets in which first planar portions and corner portions are alternately continuous in a longitudinal direction and an angle formed by two first planar portions adjacent to each other with each of the corner portions therebetween is 90° are stacked in a sheet thickness direction and has a substantially rectangular laminated structure in a side view, each of the corner portions has two or more bent portions having a curved shape in a side view of the grain-oriented electrical steel sheets and a second planar portion between the adjacent bent portions, and the sum of bent angles of the bent portions existing in one corner portion is 90°, each bent portion in a side view has an inner side radius of curvature r of 1 mm to 5 mm, the grain-oriented electrical steel sheets have a chemical composition containing, in mass %, Si: 2.0% to 7.0%, with the remainder being Fe and impurities and have a texture oriented in the Goss orientation, and at least one of two or more bent portions existing in at least one corner portion satisfies Equations (1) to (3) below.

$$Tave \leq 40 \text{ nm} \quad (1)$$

$$(To-Tu)/Tave \leq 0.50 \quad (2)$$

$$Tave(To-Tu) \leq 240 \text{ nm}^2 \quad (3)$$

Here, a thickness T (nm) of an intermediate layer provided on a surface of a base steel sheet of the grain-oriented electrical steel sheets is measured at multiple sites of the first and second planar portion regions adjacent to the bent portions, the average thickness of the thickness T (nm) of the intermediate layer is regarded as Tave (am), the maximum thickness is regarded as Tmax (am), the minimum thickness is regarded as Tmin (nm), the average value of data where T>Tave is regarded as To (nm), and the average value of data where T<Tave is regarded as Tu (nm).

1. Shapes of Wound Cores and Grain-Oriented Electrical Steel Sheets

First, the shapes of wound cores according to these embodiments will be described. The shapes of wound cores and grain-oriented electrical steel sheets described here are not particularly new. For example, the shapes merely correspond to the shapes of known wound cores and grain-oriented electrical steel sheets introduced in Patent Documents 9 to 11 in Background Art.

Figure 2:
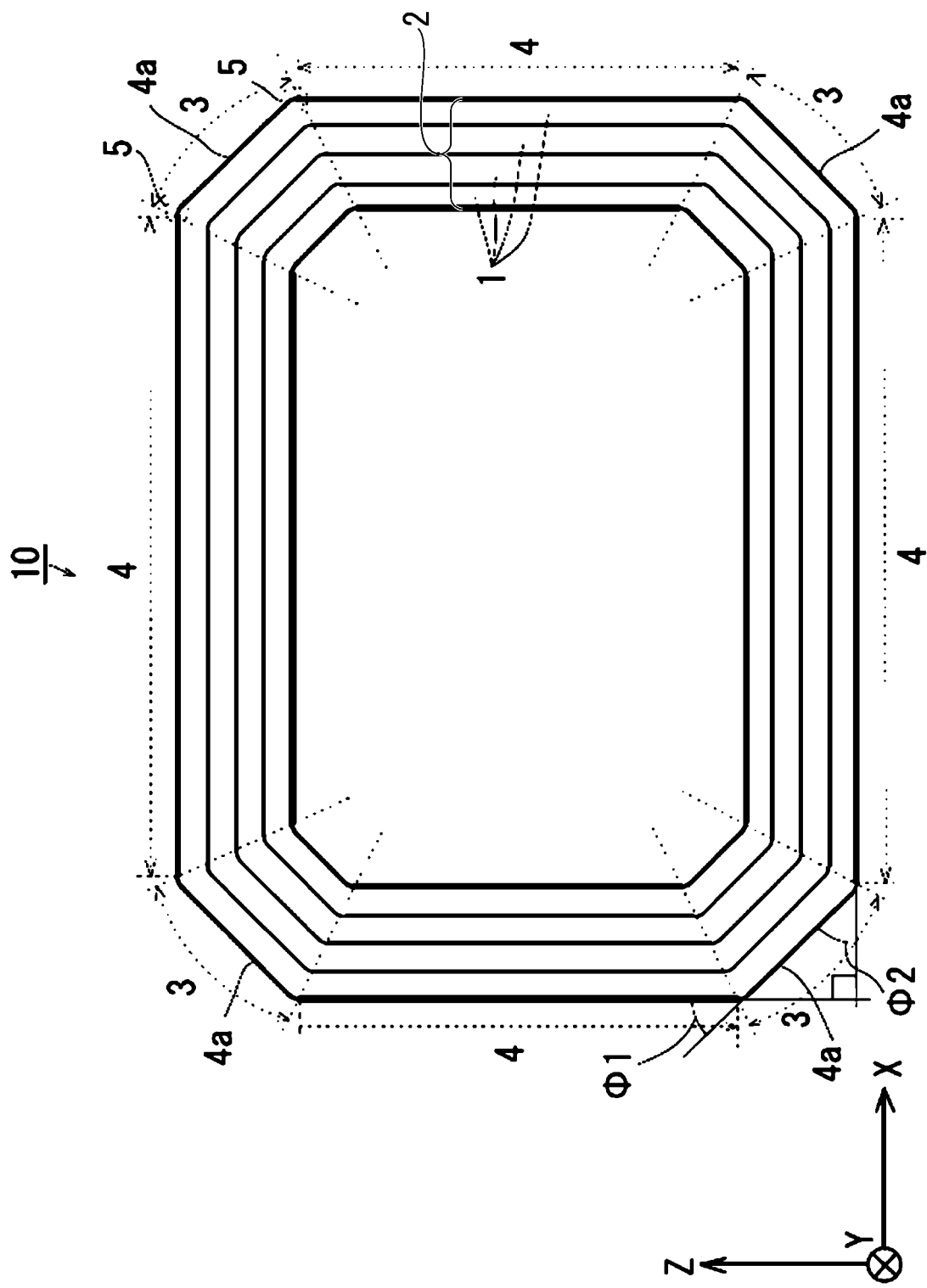
FIG. 2 is a side diagram of the wound core shown in the embodiment of FIG. 1.
Figure 3:
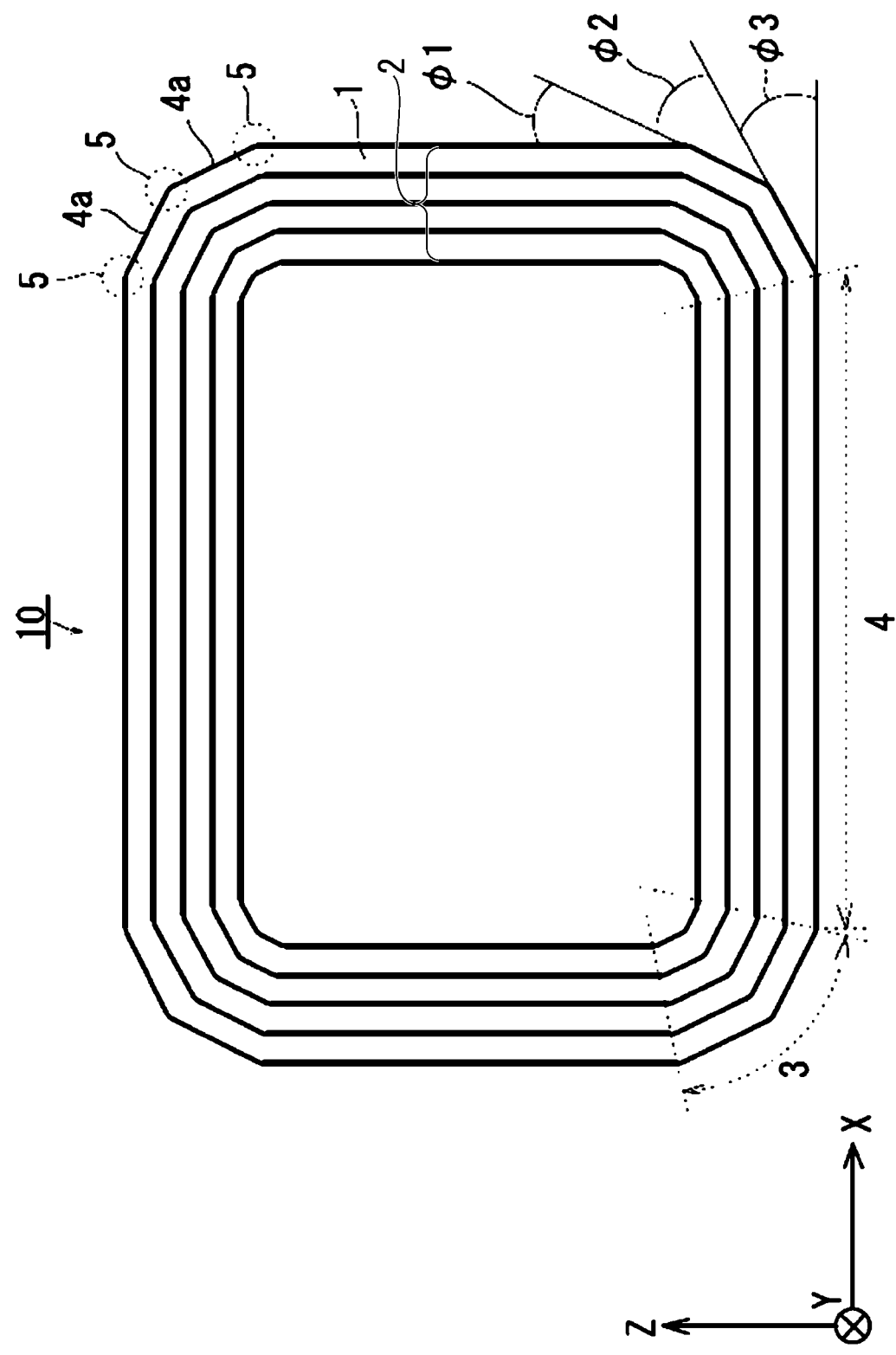
FIG. 3 is a side diagram schematically showing another embodiment of a wound core according to the present invention.

FIG. 1 is a perspective view schematically showing one embodiment of a wound core. FIG. 2 is a side diagram of the wound core shown in the embodiment of FIG. 1. In addition, FIG. 3 is a side diagram schematically showing another embodiment of a wound core.

The side view in these embodiments means viewing long-shape grain-oriented electrical steel sheets constituting a wound core in the width direction (Y-axis direction in FIG. 1). The side diagram is a diagram (diagram of FIG. 1 in the Y-axis direction) showing a shape visible in a side view.

A wound core according to the present embodiment includes: a substantially rectangular (polygonal) wound core main body 10 in a side view. The wound core main body 10 has a substantially rectangular laminated stricture 2 in a side view in which grain-oriented electrical steel sheets 1 are stacked in a sheet thickness direction. The wound core main body 10 may be used as a wound core as it is or may have well-known fasteners such as a binding band as necessary to integrally fix a plurality of stacked grain-oriented electrical steel sheets 1.

In the present embodiment, the iron core length of the wound core main body 10 is not particularly limited. Even if the iron core length of the iron core changes, the volume of bent portions 5 is constant, so iron loss generated in the bent portions 5 is constant. The longer the iron core length, the smaller the volume fraction of the bent portions 5 with respect to the wound core main body 10, and therefore the smaller the influence on iron loss deterioration. Accordingly, the iron core length of the wound core main body 10 is preferably long. The iron core length of the wound core main body 10 is preferably 1.5 m or more and more preferably 1.7 m or more. In the present embodiment, the iron core length of the wound core main body 10 is a circumferential length of the wound core main body 10 at the central point in the laminating direction in a side view.

The wound core of the present embodiment can be suitably used for any conventionally known applications.

As shown in FIGS. 1 and 2, a wound core main body 10 includes a portion in which grain-oriented electrical steel sheets 1 in which first planar portions 4 and corner portions 3 are alternately continuous in a longitudinal direction and an angle formed by two first planar portions 4 adjacent to each of the corner portions 3 therebetween is 90° are stacked in a sheet thickness direction and has a substantially rectangular laminated structure 2 in a side view. In the this specification, "first planar portion" and "second planar portion" each may be simply described as "planar portion."

Each of the corner portions 3 of the grain-oriented electrical steel sheets 1 has two or more bent portions 5 having a curved shape in a side view of the grain-oriented electrical steel sheets, and the sum of bent angles of the bent portions 5 existing in one corner portion 3 is 90°. A corner portion 3 has a second planar portion 4a between adjacent bent portions 5. Accordingly, the corner portion 3 has a configuration including two or more bent portions 5 and one or more second planar portions 4a.

The embodiment of FIG. 2 is a case where one corner portion 3 has two bent portions 5. The embodiment of FIG. 3 is a case where one corner portion 3 has three bent portions 5.

As shown in these examples, in the present embodiment, one corner portion can be formed with two or more bent portions, and a bent angle φ (such as φ1, φ2, and φ3) of a bent portion 5 is preferably 60° or less and more preferably 45° or less from the viewpoint of minimizing iron loss by minimizing generation of strain due to deformation during processing.

In the embodiment of FIG. 2 in which one corner portion has two bent portions, it is possible to set, for example, φ1 to 60° and φ2 to 30° or φ1 to 45° and φ2 to 45° from the viewpoint of reducing iron loss. In addition, in the embodiment of FIG. 3 in which one corner portion has three bent portions, it is possible to set, for example, φ1 to 30°, φ2 to 30°, and φ3 to 30° from the viewpoint of reducing iron loss. Furthermore, folding angles (bent angles) are preferably equal from the viewpoint of production efficiency. Therefore, it is preferable to set φ1 to 45° and φ2 to 45° in a case where one corner portion has two bent portions, and it is preferable to set, for example, φ1 to 30°, φ2 to 30°, and φ3 to 30° from the viewpoint of reducing iron loss in the embodiment of FIG. 3 in which one corner portion has three bent portions.

Figure 4:
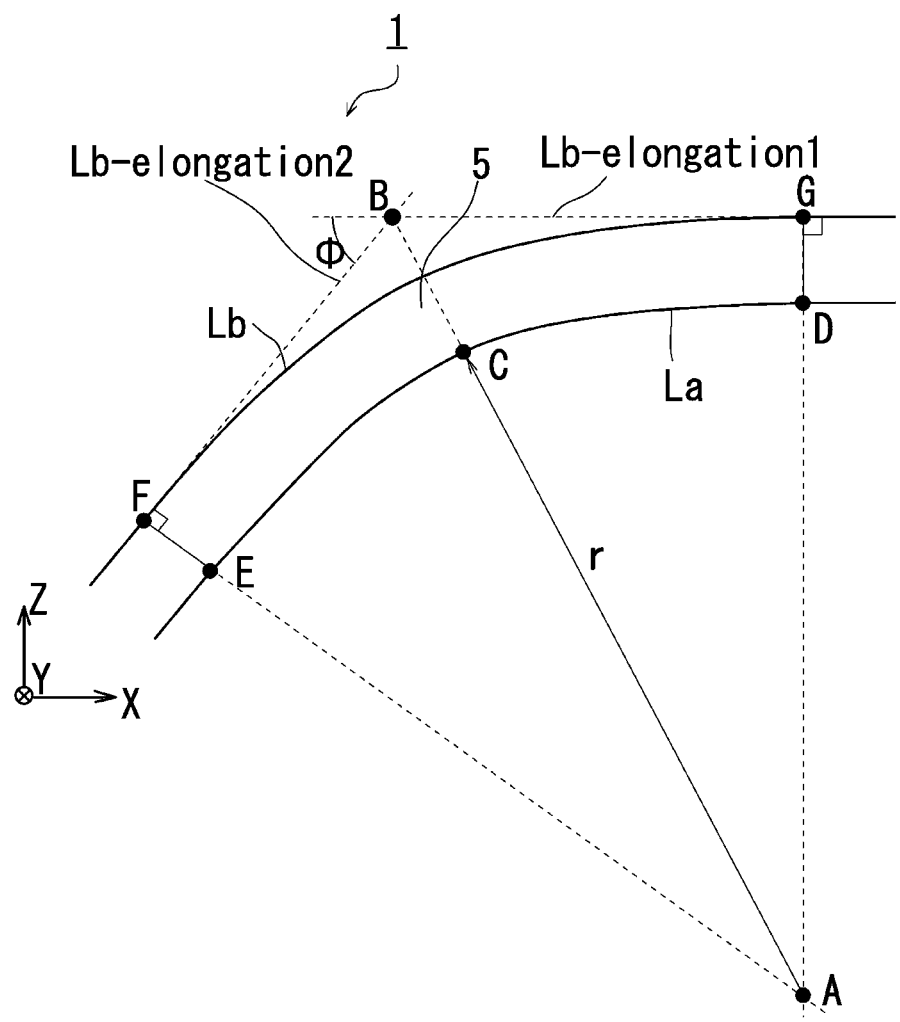
FIG. 4 is a side diagram schematically showing one example of a bent portion of a grain-oriented electrical steel sheet constituting a wound core according to the present invention.

The bent portion 5 will be described in more detail with reference to FIG. 4. FIG. 4 is a diagram schematically showing one example of a bent portion (curved portion) of a grain-oriented electrical steel sheet. The bent angle of the bent portion 5 means an angle difference between a front straight portion and a rear straight portion in the bending direction in the bent portion 5 of the grain-oriented electrical steel sheet 1 and is expressed as an angle (p of a supplementary angle of an angle formed by two virtual lines Lb-elongation1 and Lb-elongation2 obtained by extending straight portions that are surfaces of planar portions 4, 4a on both sides sandwiching the bent portion 5 on the outer surface of the grain-oriented electrical steel sheet 1. At this time, a point where an extended straight line separates from the surface of the steel sheet is a boundary between a planar portion and a bent portion on the surface on the outer side of the steel sheet, and is a point F and a point G in FIG. 6.

Furthermore, straight lines perpendicular to the outer surface of the steel sheet respectively extend from the points F and G, and intersections with the inner surface of the steel sheet are respectively a point E and a point D. Each of the points E and D is a boundary between a planar portion and a bent portion on the inner surface of the steel sheet.

Figure 6:
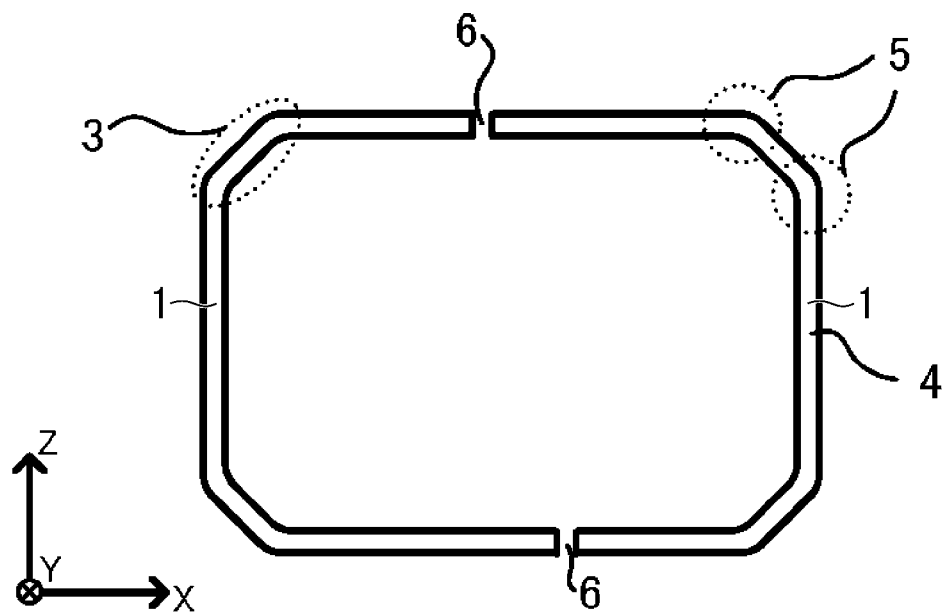
FIG. 6 is a side diagram schematically showing another example of a single-layer grain-oriented electrical steel sheet constituting a wound core according to the present invention.

In the present embodiment, in a side view of the grain-oriented electrical steel sheet 1, the bent portion is a portion of the grain-oriented electrical steel sheet 1 surrounded by the above points D, E, F, and G. In FIG. 6, the surface of the steel sheet between the points D and E, that is, the inner surface of the bent portion 5, is indicated by La, and the surface of the steel sheet between the points F and G, that is, the outer surface of the bent portion 5, is indicated by Lb.

In addition, the inner side radius of curvature r in a side view of the bent portion 5 is shown in FIG. 4. The radius of curvature r of the bent portion 5 is obtained by approximating the above La with an arc passing through the points E and D. The smaller the radius of curvature r, the sharper the curvature of the curved portion of the bent portion 5, and the larger the radius of curvature r, the gentler the curvature of the curved portion of the bent portion 5.

In the wound core of the present embodiment, the radius of curvature r at each bent portion 5 of each grain-oriented electrical steel sheet 1 laminated in the sheet thickness direction may vary to some extent. This variation may be due to molding accuracy, and unintended variation may occur due to handling or the like during lamination. Such an unintended error can be minimized to about 0.2 mm or less in current normal industrial production. In a case where such variations are large, a representative value can be obtained by measuring the radius of curvature r of a sufficiently large number of steel sheets and averaging them. In addition, it is thought that the radius of curvature could be intentionally changed for some reason, and the present embodiment does not exclude such a form.

The method of measuring the inner side radius of curvature r of the bent portion 5 is not particularly limited, but the inner side radius of curvature can be measured, for example, through observation with a commercially available microscope (Nikon ECLIPSE LV150) at a magnification of 200. Specifically, the curvature center point A is obtained from the observation results. As a method of obtaining this, for example, if the intersection of the line segment EF and the line segment DG extending inward on the side opposite to the point B is defined as A, the size of the inner side radius of curvature r corresponds to the length of the line segment AC.

In the present embodiment, the inner side radius of curvature r of the bent portion 5 can be set to be within the range of 1 mm to 5 mm and the form of an intermediate layer provided on the surface of a base steel sheet of a grain-oriented electrical steel sheet 1 described below can be controlled optimally to optimize the efficiency of an iron core which is appropriate for magnetic properties. The effect of the present embodiment is more significantly exhibited when the inner side radius of curvature r of the bent portion 5 is preferably 3 mm or less.

In addition, it is the most preferable form that all bent portions 5 existing in the iron core satisfy the inner side radius of curvature r defined in the present embodiment. In a case where there is a bent portion 5 satisfying the inner side radius of curvature r of the present embodiment and a bent portion 5 not satisfying the inner side radius of curvature r of the present embodiment, at least half of the bent portions 5 desirably satisfy the inner side radius of curvature r defined in the present embodiment.

Figure 5:
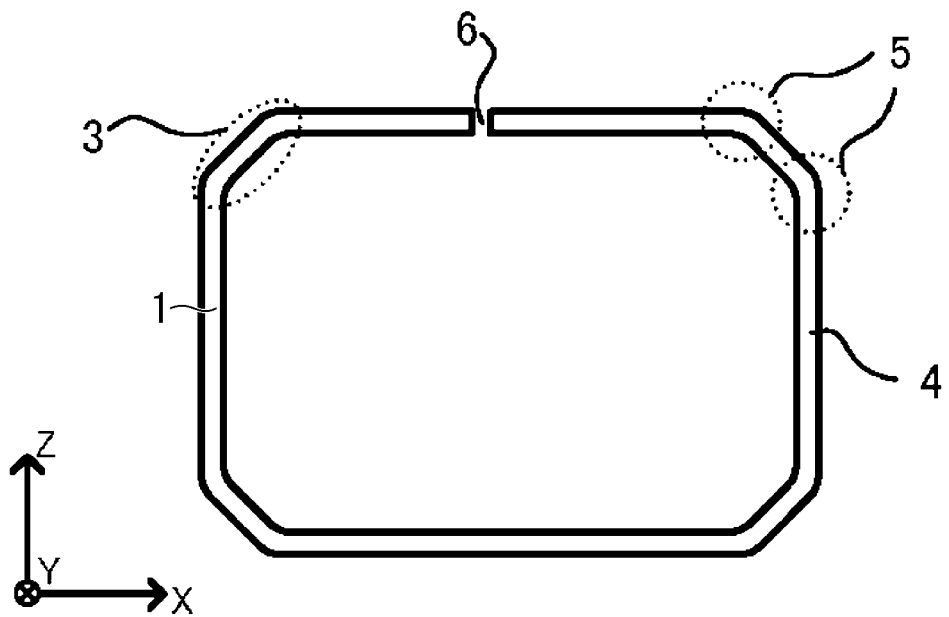
FIG. 5 is a side diagram schematically showing one example of a single-layer grain-oriented electrical steel sheet constituting a wound core according to the present invention.

FIGS. 5 and 6 are diagrams each schematically showing one example of a single-layer grain-oriented electrical steel sheet 1 in a wound core main body 10. As shown in the examples of FIGS. 5 and 6, the grain-oriented electrical steel sheet 1 used in the present embodiment is bent, has a corner portion 3, composed of two or more bent portions 5, and a planar portion 4, and forms a substantially rectangular ring in a side view via a joining part 6 (gap) which is an end surface of one or more grain-oriented electrical steel sheets 1 in the longitudinal direction.

In the present embodiment, it is sufficient as long as the wound core main body 10 has a laminated structure 2 with a substantially rectangular shape as a whole in a side view. One grain-oriented electrical steel sheet 1 may form one layer of the wound core main body 10 via one joining part 6 as shown in the example of FIG. 5 (one grain-oriented electrical steel sheet 1 is connected via one joining part 6 for each winding). Alternatively, one grain-oriented electrical steel sheet 1 may constitute about half the circumference of a wound core and two grain-oriented electrical steel sheets 1 may form one layer of the wound core main body 10 via two joining parts 6 as shown in the example of FIG. 6 (two grain-oriented electrical steel sheets 1 are connected to each other via two joining parts 6 for each winding).

The thickness of the grain-oriented electrical steel sheet 1 used in the present embodiment is not particularly limited and may be appropriately selected depending on applications and the like, but is usually within a range of 0.15 mm to 0.35 mm and preferably within a range of 0.18 mm to 0.23 mm.

2. Configuration of Grain-Oriented Electrical Steel Sheets

Next, the configuration of the grain-oriented electrical steel sheets 1 constituting the wound core main body 10 will be described. The present embodiment has features such as the form of the intermediate layer near the bent portions 5 of the adjacently laminated electrical steel sheets and the arrangement site of the electrical steel sheets in the iron core in which the form of the intermediate layer is controlled.

(1) Form of Intermediate Layer in Planar Portion Adjacent to Bent Portion

In the grain-oriented electrical steel sheets 1 constituting the wound core of the present embodiment, the form of the intermediate layer in the laminated steel sheets is controlled to be thin and smooth in the vicinity of at least a part of the bent portions 5. If the form of the intermediate layer near the bent portions 5 is thick and uneven, the efficiency of the iron core hiving the shape of the iron core in the present embodiment significantly deteriorates.

Although the mechanism by which such a phenomenon occurs is not clear, it is thought as follows.

The target iron core of the present embodiment is designed such that the planar portions 4, 4a which are hardly distorted are relatively very wide so that the magnetic properties of the steel sheets which are sufficiently reflected as properties of the iron core, and the strain (deformation) due to bending is limited to very narrow regions near the bent portions 5. For this reason, the deterioration in the magnetic properties in the regions near the bent portions 5 affects the properties of the entire iron core. The deterioration in the magnetic properties in the bent portions 5 is basically thought to be caused by the change in magnetic domain structure including the amount of introduced lattice defects such as dislocation density and the resulting change in crystal orientation. There is almost no practical control guideline for the change in magnetic domain structure due to strain in bending deformation with an extremely small diameter which is the target of the present embodiment. However, according to the knowledge that forms the basis of the present embodiment, it is thought that, when the form of the intermediate layer is thin and smooth, the change in magnetic domain structure when the same strain is applied is small and favorable magnetic properties are likely to be maintained. It is simply thought that, if the intermediate layer which is relatively harder than the base steel sheet is thick and has a complicated interface form with the base steel sheet, complicated strain occurs especially in a surface layer region (near the interface with the intermediate layer) of the base steel sheet, which complicates the magnetic domain structure and greatly deteriorates the magnetic properties. Such an action mechanism of the present embodiment is thought to be a special phenomenon in the iron core with a specific shape, which is the target of the present embodiment. Although the mechanism has hardly been considered so far, it can be interpreted that the mechanism is consistent with the information obtained by the present inventors.

In the specification of the present application, the term "intermediate layer" basically means a layered (film-shaped) region sandwiched between a base steel sheet which is an α-Fe phase and an insulating coating imparting tension and insulation properties to the grain-oriented electrical steel sheets 1 to ensure adhesion with respect to the base steel sheet and the insulating coating. The material of the intermediate layer is not limited to forsterite, $SiO_2$, and TiN exemplified in Background Art above, and well-known substances formed for the above purpose are targeted. In addition, considering the action mechanism of the effect of the present embodiment, a substance having a considerable difference in deformability from that of the base steel sheet is targeted. In the present embodiment, this is defined as a compound specifies. That is, the intermediate layer targeted by the present embodiment is composed of oxides, carbides, and nitrides of metal elements, and composites thereof. These are substances known to play a role of ensuring adhesion by being sandwiched between the base steel sheet and the insulating coating in the grain-oriented electrical steel sheets 1.

In a case where the difference in deformability between the base steel sheet and the intermediate layer is small, the entire interface region deforms uniformly regardless of the thickness or form of the intermediate layer. Therefore, it is unnecessary to apply the effect of the present embodiment, and at the same time, the effect of the present embodiment is not expressed.

In the present embodiment, the form of the intermediate layer is measured as follows.

The grain-oriented electrical steel sheets 1 taken out from the iron core are observed in a cross section parallel to the side surface of the iron core. The observation method may be a general method and does not require a special method. Since the thickness of the intermediate layer targeted by the present embodiment is very thin, the cross section thereof is observed with a scanning transmission electron microscope (STEM) to measure the thickness of the intermediate layer.

Specifically, in the first planar portions 4 and the second planar portions 4a regions adjacent to the bent portions 5 on the above observation cross section, quantitative analysis is performed on 101 sites (that is, a measurement region of 10 μm) determined at intervals of 0.1 μm in the direction (longitudinal direction) along the steel sheet surface at intervals of 1 nm in the sheet thickness direction through energy dispersive X-ray spectroscopy (EDS) with an electron beam diameter of 10 nm. A region in which the total concentration of constituent elements of a substance taken for an intermediate layer (for example, the total concentration of Si and O if the intermediate layer is $SiO_2$ and the total concentration of Ti and N if the intermediate layer is TiN) is 50 atomic % or more is regarded as the intermediate layer, and the thickness thereof is determined.

In the present embodiment, regarding first planar portion 4 and second planar portion 4a regions adjacent to a bent portion 5, the first planar portion 4 and second planar portion 4a regions separated by more than twice the length of the bent portion 5 from boundaries between the bent portion 5 and the first planar portion 4 and between the bent portion 5 and the second planar portion 4a is set as a measurement region of the intermediate layer. Here, the reason why the region is set to be more than twice the length of the bent portion 5 is because the influence of the deformation of the intermediate layer due to bending can be avoided if the region is separated by such a distance from the bent portion 5. It should be noted that the effect of the present embodiment is originally expressed by the action mechanism according to the form of the intermediate layer within the bent portion 5 as described above and is essentially evaluated by how the intermediate layer within the bent portion 5 is deformed or how the deformation of the base steel sheet is affected. However, since the intermediate layer within the bent portion 5 is deformed complicatedly and the structure of the base steel sheet also changes complicatedly according to the form thereof as described above, it is thought that it is difficult to quantitatively determine the deformation and the change as a definition of the present embodiment. For this reason, in the present embodiment, the quantitative value corresponding to the exhibition of the above action mechanism is defined by the state before bending deformation is applied, that is, the form of the intermediate layer of the first planar portion 4 and the second planar portion 4a.

The second planar portion 4a region is within a corner portion 3 and the first planar portion 4 region is outside the corner portion 3. The form of the intermediate layer is determined by a second planar portion 4a and/or a first planar portion 4 in at least one bent portion 5.

In the present embodiment, characteristic values relating to the form of the intermediate layer are further determined as follows from the 101 measurement values of the thickness of the intermediate layer which are obtained as described above.

Figure 7:
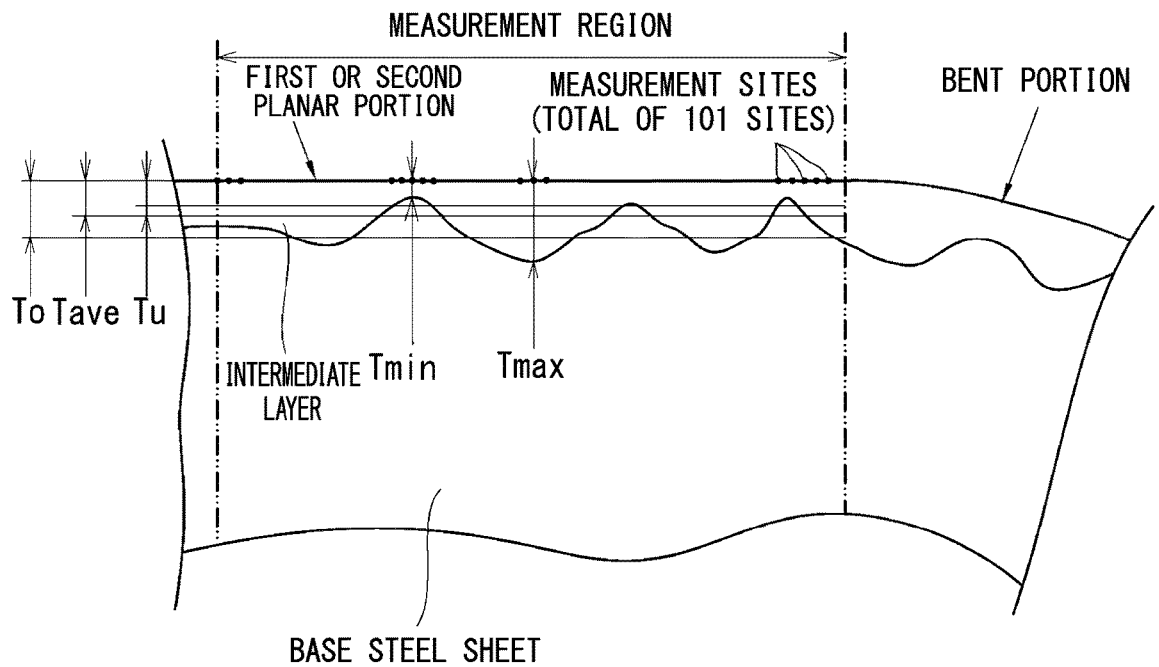
FIG. 7 is a schematic diagram for illustrating a method of measuring the thickness of an intermediate layer of a grain-oriented electrical steel sheet constituting a wound core according to the present invention.

For example, as shown in FIG. 7, first, the average thickness of the thickness T (nm) of the intermediate layer at 101 sites (measurement sites) is regarded as Tave (nm), the maximum thickness is regarded as Tmax (nm), the minimum thickness is regarded as Tmin (nm), the average value of data where T>Tave is regarded as To (nm), and the average value of data where T<Tave is regarded as Tu (nm). Furthermore, in a thickness distribution along a surface direction of the steel sheets (longitudinal direction), a region where measurement values where T>Tave are continuous is counted as one region, and the number of the regions within the entire measurement region is defined as N. This N is the number of convex regions within the measurement region of 10 μm. That is, in the measurement region of 10 μm, when a continuous region thicker than Tave (a region projecting in the thickness direction) is regarded as a convex region, N is the number of convex regions.

Here, the above form of the intermediate layer is measured on the outer side and the inner side of the steel sheets, and the values obtained on the surfaces are averaged to determine Tave, Tmax, Tmin, To, Tu, and N of the steel sheets. The outer side of the steel sheets is schematically shown in FIG. 7, and the thickness of the intermediate layer is deformed for convenience of explanation. In addition, although an insulating coating is formed on the intermediate layer, the insulating coating will not be illustrated.

In the present embodiment, at least one of two or more bent portions 5 existing in at least one corner portion 3 satisfies Equations (1) to (3) below.

$$Tave \leq 40 \text{ nm} \quad (1)$$

$$(To-Tu)/Tave \leq 0.50 \quad (2)$$

$$Tave(To-Tu) \leq 240 \text{ nm}^2 \quad (3)$$

The definition of Equation (1) is not special, and is a general definition conforming to the grain-oriented electrical steel sheets 1 in which the intermediate layer interface is mirror-finished. The left side of Equation (1) is preferably 20 nm or less and more preferably 10 nm or less.

Equation (2) can be said to be one of definitions indicating a special feature of the present embodiment. Considering the above mechanism, this definition indicates that a small variation (difference between a convex portion and a concave portion) in thickness of the intermediate layer is a necessary condition. The left side of Equation (2) is preferably 0.3 or less and more preferably 0.2 or less.

Equation (3) is one of a definition indicating a special feature of the present embodiment. This definition indicates that the thinner the intermediate layer, the more allowable the variation (difference between a convex portion and a concave portion) in thickness of the intermediate layer. This is thought to be a definition corresponding to an index for evaluating the degree of influence on a base steel sheet in a case where steel sheets covered with a coating harder than that of the base steel sheet are bent and deformed. The left side of Equation (3) is preferably 200 nm² or less and more preferably 180 nm² or less.

If Equations (1) to (3) above are satisfied, the magnetic domain structure of the bent portions 5 becomes a structure in which the influence of bending is minimized, and the effect of the present embodiment is expressed. In addition, needless to say, in one corner portion 3, it is preferable that all the bent portions 5 existing in the corner portion 3 satisfy Equations (1) to (3) above. Furthermore, needless to say, it is preferable to all of the four corner portions 3 existing in the wound core satisfy Equations (1) to (3) above.

In another embodiment, at least one of two or more bent portions 5 existing in at least one corner portion 3 satisfies Equation (4) below.

$$N(To-Tu) \leq 24 \text{ nm} \quad (4)$$

This definition indicates the degree of steepness of variation in sheet thickness of an intermediate layer, that is, the degree of change in sheet thickness from a convex portion to a concave portion of a sheet thickness distribution in a region along the intermediate layer. If this value is large, the sheet thickness changes rapidly in a local region of the intermediate layer, the base steel sheet in the bent portions 5 is deformed complicatedly, and the magnetic domain structure is complicated. Therefore, the iron core efficiency is lowered. In addition, needless to say, in one corner portion 3, it is preferable that all the bent portions 5 existing in the corner portion 3 satisfy Equation (4) above. Furthermore, needless to say, it is preferable to all of the four corner portions 3 existing in the wound core satisfy Equation (4) above.

In still another embodiment, at least one of two or more bent portions 5 existing in at least one corner portion 3 satisfies Equation (5) below.

$$N \geq 2 \quad (5)$$

From the viewpoint of the Equation (4) above, this definition seems strange because it means that the degree of steepness is increased. However, this indicates that, when N becomes a number above a certain level, that is, when the interval of change in sheet thickness from the convex portion to the concave portion of a sheet thickness distribution in a region along the intermediate layer becomes very narrow, even if the degree of steepness evaluated by Equation (4) is a high value to some extent, the complication of the magnetic domain structure in the bent portions 5 is minimized. Although the reason for this is unclear, it is thought that this is because there is a limit to the complication and refinement of the magnetic domain structure even if the magnitude of variation in interface form is reduced to some extent, and therefore the interface acts like a flat interface. According to Equation (5) above, if the interval (pitch) of change in sheet thickness is 5 μm or less, the influence of the base steel sheet on the magnetic domain structure is interpreted to be closer to that of a flat surface. In addition, needless to say, in one corner portion 3, it is preferable that all the bent portions 5 existing in the corner portion 3 satisfy Equation (5) above. Furthermore, needless to say, it is preferable to all of the four corner portions existing in the wound core satisfy Equation (5) above.

In still another embodiment, at least one of two or more bent portions 5 existing in at least one corner portion 3 satisfies Equation (6) below.

$$(Tmax - Tmin) < Tave \quad (6)$$

This definition is simply an index indicating a relative magnitude of variation in sheet thickness of the intermediate layer. It can be intuitively understood that the smaller the value of Equation (6) is, the more preferable it is, but it has a special meaning in the present embodiment. In other words, since the intermediate layer targeted by the present embodiment is very thin, there is an unavoidable concern that an abnormal portion may be generated due to variations in industrial production conditions. For example, there may be a few regions where the intermediate layer is missing. The present embodiment defines that it is preferable that such regions be minimized. In addition, needless to say, in one corner portion 3, it is preferable that all the bent portions existing in the corner portion 3 satisfy Equation (6) above. Furthermore, needless to say, it is preferable to all of the four corner portions 3 existing in the wound core satisfy Equation (6) above.

(2) Grain-Oriented Electrical Steel Sheets

As described above, the base steel sheet of the grain-oriented electrical steel sheets 1 used in the present embodiment is a steel sheet in which crystal grain orientations in the base steel sheet is highly concentrated in the {110}<001> orientation, and has excellent magnetic properties in the rolling direction.

A well-known grain-oriented electrical steel sheet can be used as the base steel sheet in the present embodiment. Hereinafter, one example of a preferred base steel sheet will be described.

A base steel sheet has a chemical composition containing, in mass %, Si: 2.0% to 6.0%, with the remainder being Fe. This chemical composition allows the crystal orientation to be controlled to the Goss texture concentrated in the {110}<001> orientation favorable magnetic properties to be secured. Other elements are not particularly limited, and it is allowed to contain known elements within a well-known range instead of Fe. Ranges of the representative amounts of representative elements are as follows.

C: 0% to 0.0050%,
Mn: 0% to 1.0%,
S: 0% to 0.0150%,
Se: 0% to 0.0150%,
Al: 0% to 0.0650%,
N: 0% to 0.0050%,
Cu: 0% to 0.40%,
Bi: 0% to 0.010%,
B: 0% to 0.080%,
P: 0% to 0.50%,
Ti: 0% h to 0.0150%,
Sn: 0% to 0.10%,
Sb: 0% to 0.10%,
Cr: 0% to 0.30%,
Ni: 0% to 1.0%,
Nb: 0% to 0.030%,
V: 0% to 0.030%,
Mo: 0% to 0.030%,
Ta: 0% to 0.030%,
W: 0% to 0.030%,

Since these selective elements may be contained depending on the purpose, it is unnecessary to limit the lower limit value, and it is unnecessary to substantially contain them. In addition, even if these selective elements are contained as impurities, the effect of the present embodiment is not impaired. Impurities refer to elements that are unintentionally contained, and mean elements that are mixed from ore and scraps as raw materials, a production environment, and the like when the base steel sheet is industrially produced.

The chemical component of the base steel sheet may be measured by a general analysis method for steel. For example, the chemical composition of the base steel sheet may be measured using Inductively Coupled Plasma-Atomic Emission Spectrometry (ICP-AES). Specifically, the chemical composition thereof can be specified by, for example, acquiring a 35 mm square test piece from the central position of the base steel sheet after removing a coating and performing measurement with ICPS-8100 (measurement device) available from Shimadzu Corporation or the like under the conditions based on a calibration curve created in advance. C and S may be measured through a combustion-infrared absorption method, and N may be measured through an inert gas fusion-thermal conductivity method.

The above chemical composition is a component of the base steel sheet. In a case where a grain-oriented electrical steel sheet 1 as a measurement sample has, for example, an insulating coating and a primary film (such as glass film or an intermediate layer) made of an oxide or the like on the surface, these coatings are removed through a well-known method and the chemical composition is then measured.

(3) Method of Producing Grain-Oriented Electrical Steel Sheet

The method of producing the grain-oriented electrical steel sheet 1 is not particularly limited, and a conventionally known method of producing a grain-oriented electrical steel sheet can be appropriately selected. Preferred specific examples of the production method include a method in which a slab containing 0.04 to 0.1 mass % of C and having the chemical composition of the above grain-oriented electrical steel sheet 1 for the rest is heated to 1,000° C. or higher to perform hot rolling, and then hot-band annealing is performed as necessary, a cold-rolled steel sheet is subsequently obtained through cold rolling once or cold rolling twice or more including intermediate annealing, heated at 700° C. to 900° C. in, for example, a wet hydrogen-inert gas atmosphere, subjected to decarburization annealing, further subjected to nitridation annealing as necessary, and subjected to finish annealing at about 1,000° C. after an annealing separator is applied to the cold-rolled steel sheet to form an insulating coating at about 900° C. Furthermore, after that, coating or the like for adjusting the dynamic friction coefficient may be performed.

In addition, the effect of the present embodiment can be obtained even with a steel sheet subjected to processing generally called "magnetic domain control" by a well-known method in the step of producing a steel sheet.

A method of controlling the form of an intermediate layer, which is a feature of the grain-oriented electrical steel sheet 1 used in the present embodiment, is not particularly limited, and a well-known method may be used as appropriate. For example, various forms of intermediate layers can be formed by thermal oxidation after finish annealing using an annealing separator mainly composed of alumina ($Al_2O_3$). Alternatively, after finish annealing using an annealing separator mainly composed of magnesia (MgO), forsterite formed on the surface of a steel sheet can be peeled off by pickling or grinding, and then oxidation behavior during a temperature raising process of baking annealing for forming an insulating coating can be controlled to form various forms of intermediate layers.

3. Method of Producing Wound Core

The method of producing a wound core according to the present embodiment is not particularly limited as long as it can produce a wound core according to the present embodiment, and methods according to well-known wound cores introduced as Patent Documents 9 to 11 in Background Art may be applied, for example. In particular, it can be said that a method of using a production device UNICORE (https://www.aemcores.com.au/technology/unicore/) of AEM UNI-CORE is optimal.

Furthermore, a heat treatment may be performed as necessary according to the well-known method. In addition, a wound core main body 10 obtained may be used as a wound core as it is or may be used as a wound core obtained by integrally fixing a plurality of stacked grain-oriented electrical steel sheets 1 using a well-known fastener such as a binding band, as necessary.

The present embodiment is not limited to the above embodiments. The above embodiments are examples, and any form which has substantially the same configuration as the technical idea described in the claims of the present invention and exhibits the same operational effects is included in the technical scope of the present invention.

EXAMPLES

Hereinafter, the technical details of the present invention will be further described with reference to examples of the present invention. The conditions in the examples shown below are condition examples employed for confirming the feasibility and effect of the present invention, and the present invention is not limited to these condition examples. In addition, the present invention may use various conditions as long as the gist of the present invention is not deviated and the object of the present invention is achieved.

(Grain-Oriented Electrical Steel Sheets)

A slab having a chemical composition shown in Table 1 (mass %, the remainder other than the displayed elements is Fe) was used as a material to produce a final product having a chemical composition shown in Table 2 (mass %, the remainder other than the displayed elements is Fe).

In Tables 1 and 2, "—" indicates an element for which production and a control were not performed with awareness of the amount and of which the amount was not measured.

TABLE 1

| Steel type | Slab | | | | | | | | |
|---|---|---|---|---|---|---|---|---|---|
| | C | Si | Mn | S | Al | N | Cr | Bi | Nb |
| A | 0.060 | 3.36 | 0.10 | 0.007 | 0.028 | 0.008 | 0.11 | — | — |
| B | 0.060 | 3.41 | 0.11 | 0.006 | 0.029 | 0.008 | 0.12 | — | 0.007 |
| C | 0.060 | 3.37 | 0.11 | 0.006 | 0.028 | 0.008 | 0.11 | 0.002 | — |
| D | 0.080 | 3.26 | 0.08 | 0.025 | 0.027 | 0.008 | — | — | — |

TABLE 2

| Steel type | Final product | | | | | | | | |
|---|---|---|---|---|---|---|---|---|---|
| | C | Si | Mn | S | Al | N | Cr | Bi | Nb |
| A | 0.001 | 3.25 | 0.07 | 0.0007 | 0.011 | 0.0008 | 0.11 | — | — |
| B | 0.001 | 3.30 | 0.07 | 0.0008 | 0.010 | 0.001 | 0.12 | — | 0.005 |
| C | 0.001 | 3.27 | 0.07 | 0.0007 | 0.012 | 0.001 | 0.11 | 0.002 | — |
| D | 0.001 | 3.17 | 0.10 | 0.0007 | 0.009 | 0.0008 | — | — | — |

The production process conforms to the production conditions for general known grain-oriented electrical steel sheets.

Hot rolling, hot-band annealing, and cold rolling were performed. Some of the cold-rolled steel sheets after decarburization annealing were subjected to a nitridation treatment (nitridation annealing) in a hydrogen-nitrogen-ammonia mixed atmosphere.

Furthermore, the main component was magnesia or alumina, and an annealing separator with a different mixing ratio was applied and subjected to finish annealing. An insulating coating solution containing chromium and mainly composed of phosphate and colloidal silica was applied onto primary films formed on surfaces of finish-annealed steel sheets, and subjected to a heat treatment to form an insulating coating. For some materials, a TiN coating was formed through ion plating on the surface of a base steel sheet, which had been obtained by peeling off the primary film at a point in time of finish annealing the steel sheets and performing mirror finishing, and then, an insulating coating application solution containing chromium and mainly composed of phosphate and colloidal silica was applied thereto, and subjected to a heat treatment to form an insulating coating.

In this manner, a steel sheet in which the type and form of an intermediate layer sandwiched between a base steel sheet and an insulating coating to secure adhesion therebetween were adjusted was produced. The details of the steel sheet produced are shown in Table 3.

TABLE 3

| Steel sheet No. | Steel type | Hot rolling | | | | Hot-band annealing | | Cold rolling | | Decarburization annealing | |
|---|---|---|---|---|---|---|---|---|---|---|---|
| | | Heating temperature °C. | Finish temperature °C. | Winding temperature °C. | Sheet thickness mm | Temperature °C. | Time Seconds | Sheet thickness mm | Cold rolling rate % | Temperature °C. | Time Seconds |
| A1 | A | 1150 | 900 | 540 | 2.7 | 1100 | 20 | 0.35 | 87% | 800 | 180 |
| A2 | A | 1150 | 900 | 540 | 2.7 | 1100 | 20 | 0.35 | 87% | 800 | 180 |
| A3 | A | 1150 | 900 | 540 | 2.7 | 1100 | 20 | 0.35 | 87% | 800 | 180 |
| A4 | A | 1150 | 900 | 540 | 27 | 1100 | 20 | 0.35 | 87% | 800 | 180 |
| B1 | B | 1150 | 880 | 650 | 2.3 | 1150 | 30 | 0.23 | 90% | 820 | 120 |
| B2 | B | 1150 | 880 | 650 | 2.3 | 1150 | 30 | 0.23 | 90% | 820 | 120 |
| B3 | B | 1150 | 880 | 650 | 2.3 | 1150 | 30 | 0.23 | 90% | 820 | 120 |
| B4 | B | 1150 | 880 | 650 | 2.3 | 1150 | 30 | 0:23 | 90% | 820 | 120 |
| C1 | C | 1150 | 900 | 750 | 2.6 | 1100 | 25 | 0.26 | 90% | 850 | 150 |
| C2 | C | 1150 | 900 | 750 | 2.6 | 1100 | 25 | 0.26 | 90% | 850 | 150 |
| C3 | C | 1150 | 900 | 750 | 2.6 | 1100 | 25 | 0.26 | 90% | 850 | 150 |
| C4 | C | 1150 | 900 | 750 | 2.6 | 1100 | 25 | 0.26 | 90% | 850 | 150 |
| D1 | D | 1350 | 1030 | 540 | 2.4 | 1100 | 20 | 0.26 | 89% | 850 | 150 |
| D2 | D | 1350 | 1030 | 540 | 2.4 | 1100 | 20 | 0.26 | 89% | 850 | 150 |
| D3 | D | 1350 | 1030 | 540 | 2.4 | 1100 | 20 | 0.26 | 89% | 850 | 150 |
| D4 | D | 1350 | 1030 | 540 | 2.4 | 1100 | 20 | 0.26 | 89% | 850 | 150 |

TABLE 3-continued

| Steel sheet No. | Nitridation | Annealing separator Magnesia % | Alumina % | Additive | Finish annealing Temperature ° C. | Time Hours | Intermediate layer formation treatment | Properties B8 T | Iron loss W/kg |
|---|---|---|---|---|---|---|---|---|---|
| A1 | Done | 20 | 80 | None | 1200 | 20 | Oxidation treatment at 800° C., PH2O/PH2 = 0.1 | 1.94 | 1.12 |
| A2 |  | 100 | 0 | Titanium Oxide | 1200 | 20 | None | 1.93 | 1.13 |
| A3 |  | 100 | 0 | Titanium oxide | 1200 | 20 | Peeled off and smoothed, and then, coated with TiN | 1.93 | 1.12 |
| A4 |  | 100 | 0 | None | 1200 | 20 | None | 1.93 | 1.13 |
| B1 | Done | 20 | 80 | None | 1200 | 20 | Oxidation treatment at 800° C., PH2O/PH2 = 0.1 | 1.92 | 0.82 |
| B2 |  | 100 | 0 | Titanium oxide | 1200 | 20 | None | 1.92 | 0.83 |
| B3 |  | 100 | 0 | Titanium oxide | 1200 | 20 | Peeled off and smoothed; and then, coated with TiN | 1.92 | 0.82 |
| B4 |  | 100 | 0 | None | 1200 | 20 | None | 1.92 | 0.84 |
| C1 | Done | 20 | 80 | None | 1200 | 20 | Oxidation treatment at 800° C., PH2O/PH2 = 0.1 | 1.92 | 0.87 |
| C2 |  | 100 | 0 | Titanium oxide | 1200 | 20 | None | 1.93 | 0.88 |
| C3 |  | 100 | 0 | Titanium oxide | 1200 | 20 | Peeled off and smoothed and then, coated with TiN | 1.92 | 0.88 |
| C4 |  | 100 | 0 | None | 1200 | 20 | None | 1.92 | 0.87 |
| D1 | None | 20 | 80 | None | 1200 | 20 | Oxidation treatment at 800° C., PH2O/PH2 = 0:1 | 1.93 | 0.87 |
| D2 |  | 100 | 0 | Titanium oxide | 1200 | 20 | None | 1.93 | 0.86 |
| D3 |  | 100 | 0 | Titaniumn oxide | 1200 | 20 | Peeled off and smoothed; and then, coated with TiN | 1.92 | 0.88 |
| D4 |  | 100 | 0 | None | 1200 | 20 | None | 1.92 | 0.87 |

(Iron Core)

Figure 8:
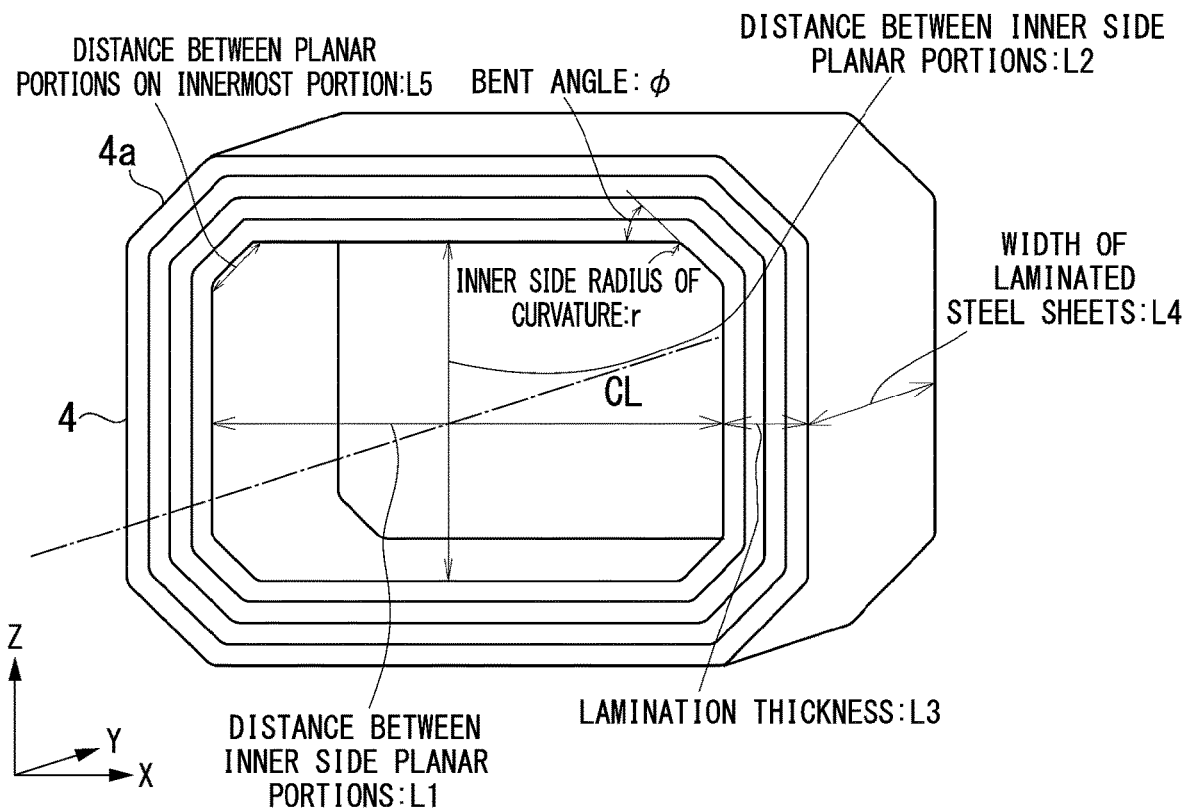
FIG. 8 is a schematic diagram showing dimensions of wound cores produced in examples and comparative examples.
Figure 9:
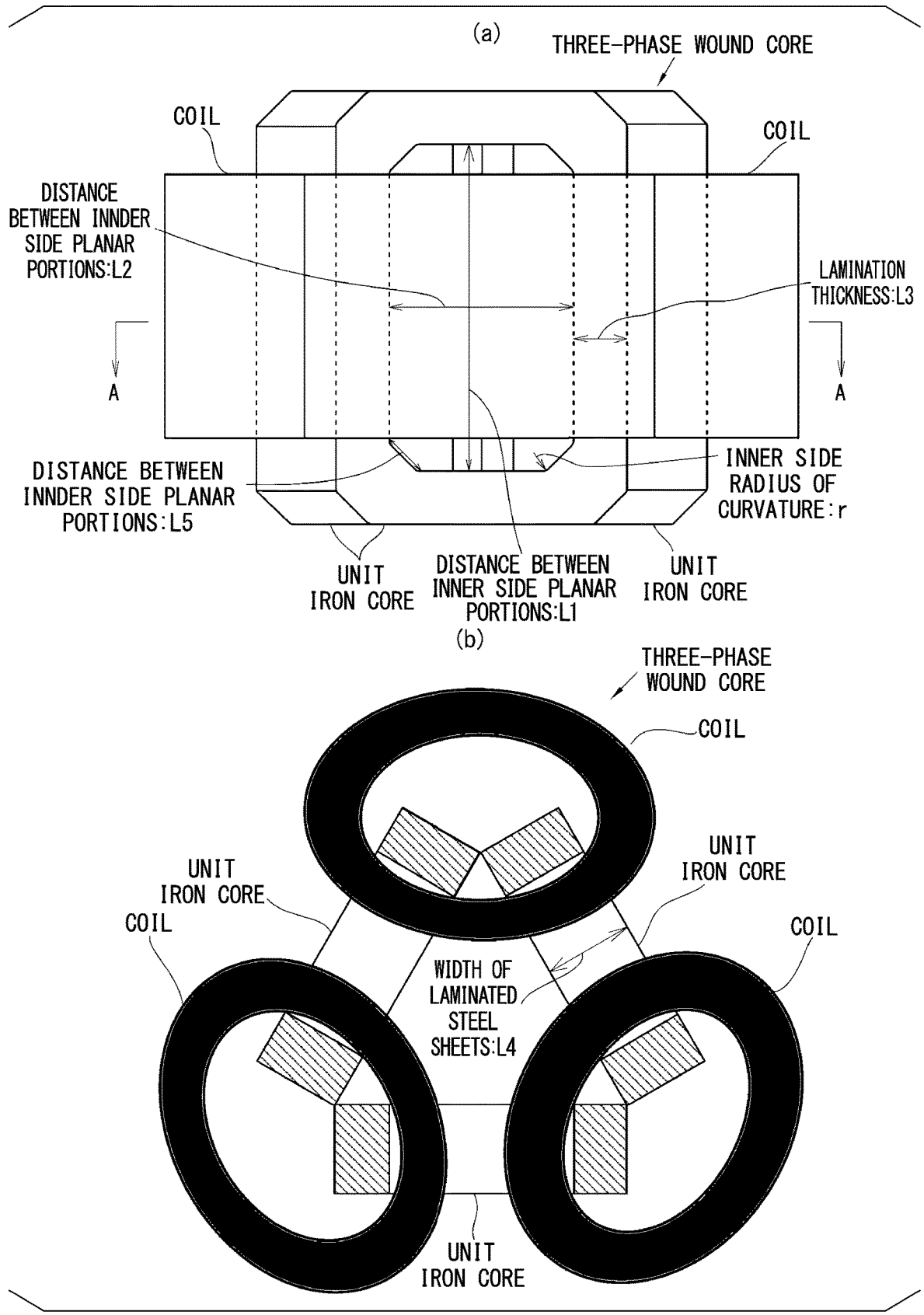
FIG. 9 shows schematic configurations of a three-phase wound core produced in the examples and the comparative examples, in which (a) is a front view and (b) is a cross-sectional view taken along line A-A of (a).

Iron cores with core Nos. a to h having shapes shown in Table 4 and FIG. 8 were produced using each steel sheet as a material. At this time, the iron cores with core Nos. g and h were not used for tests as individual iron cores, but three of each were prepared as unit iron cores and were arranged in an equilateral triangular cylinder shape as shown in FIG. 9, and a three-phase wound core (for example, the iron core shown in Japanese Unexamined Patent Application, First Publication No. 2005-333057) obtained by winding a coil around each limb (a portion including the first planar portion 4) was prepared. In addition, the three unit iron cores are arranged symmetrically around the axis of the equilateral triangular cylinder. (a) of FIG. 9 is a front view illustrating a schematic configuration of a three-phase wound core, and (b) of FIG. 9 is a cross-sectional view taken along line A-A in (a) of FIG. 9.

L1 is parallel to the X-axis direction and is a distance between parallel grain-oriented electrical steel sheets 1 on the innermost periphery of a wound core in a flat cross section including the center CL (distance between inner side planar portions). L2 is parallel to the Z-axis direction and is a distance between parallel grain-oriented electrical steel sheets 1 on the innermost periphery of a wound core in a vertical cross section including the center CL (distance between inner side planar portions). L3 is parallel to the X-axis direction and is a lamination thickness (thickness in the laminating direction) of a wound core in a flat cross section including the center CL. L4 is a width of laminated steel sheets of a wound core in a flat cross section parallel to the X-axis direction including the center CL. L5 is a distance between planar portions (distance between bent portions) which are adjacent to each other in the innermost portion of a wound core and arranged to form a right angle together. In other words, L5 is the shortest length of the planar portion 4a in the longitudinal direction between the planar portions 4, 4a of a grain-oriented electrical steel sheet on the innermost periphery. r is a radius of curvature of a bent portion on the inner side of a wound core, and e is a bent angle of the bent portion of the wound core. The substantially rectangular iron cores with core Nos. a to h in which the planar portions having a distance L1 between the planar portions on the inner side are divided at approximately the center of the distance L1 have a structure in which two iron cores having a "substantially U-shaped" are joined. Here, the iron core with core No. f is an iron core which is conventionally used as a general wound core and produced through a method in which steel sheets are wound into a cylindrical shape, corner portions 3 of the cylindrical laminated body are subsequently pressed so as to have a constant curvature, and the cylindrical laminated body is formed into a substantially rectangular shape and is then annealed to maintain the shape. For this reason, the radius of curvature r of the bent portion 5 varies greatly depending on the lamination position of the steel sheets. r in Table 4 is r on the innermost surface. r increases toward the outside and is approximately 90 mm at the outermost circumferential portion.

TABLE 4

| | Core shape | | | | | | |
|---|---|---|---|---|---|---|---|
| Core No. | L1 mm | L2 mm | L3 mm | L4 mm | L5 mm | r mm | φ ° |
| a | 300 | 180 | 60 | 150 | 25 | 1 | 45 |
| b | 300 | 180 | 60 | 150 | 25 | 3 | 45 |
| c | 300 | 180 | 60 | 150 | 25 | 6 | 45 |
| d | 300 | 180 | 60 | 150 | 25 | 5 | 30 |
| e | 300 | 180 | 60 | 150 | 25 | 8 | 45 |
| f | 300 | 180 | 60 | 150 | 0 | 30 | 90 |
| g | 300 | 180 | 60 | 100 | 25 | 2 | 90 |
| h | 300 | 180 | 60 | 100 | 25 | 6 | 90 |

(Evaluation Method)
(1) Magnetic Properties of Grain-Oriented Electrical Steel Sheet The magnetic properties of a grain-oriented electrical steel sheet 1 were measured based on a single sheet magnetic property test method (Single Sheet Tester: SST) specified in JIS C 2556: 2015.

As magnetic properties, the magnetic flux density B8 (T) in the rolling direction of a steel sheet when excitation was performed at 800 A/m and the iron loss at an AC frequency of 50 Hz and an excitation magnetic flux density of 1.7 T were measured.

(2) Form of Intermediate Layer

As described above, the form of an intermediate layer was measured through observing the cross section of a steel sheet taken out from an iron core.

(3) Efficiency of Iron Core

The efficiency of an iron core was measured based on power measurement of an iron core made of steel sheets.

The efficiency was evaluated in various iron cores produced using various steel sheets having different magnetic domain widths. The results are shown in Table 5. It can be seen that even if the same steel type is used, the efficiency of an iron core can be improved by appropriately controlling the form of an intermediate layer.

TABLE 5

| Test No. | Steel sheet No. | Core. No. | r mm | Tave nm | To nm | Tu nm | (To-Tu)/Tave | Tave(To-Tu) nm$^2$ | Tmax nm | Tmin nm | N | Loss W | Remarks |
|---|---|---|---|---|---|---|---|---|---|---|---|---|---|
| 1-1 | A1 | a | 1 | 20 | 25 | 17 | 0.400 | 160 | 35 | 15 | 3 | 83.0 | Invention example |
| 1-2 | A2 | a | 1 | 3409 | 3943 | 2760 | 0.347 | 4032847 | 4524 | 2400 | 8 | 89.7 | Comparative example |
| 1-3 | A3 | a | 1 | 19 | 23 | 17 | 0.316 | 114 | 33 | 15 | 3 | 83.5 | Invention example |
| 1-4 | A4 | a | 1 | 1867 | 2754 | 1588 | 0.625 | 2176922 | 2960 | 1456 | 7 | 88.7 | Comparative example |
| 1-5 | B1 | a | 1 | 24 | 28 | 18 | 0.417 | 240 | 34 | 15 | 2 | 63.2 | Invention example |
| 1-6 | B2 | a | 1 | 3305 | 3694 | 2684 | 0.306 | 3338050 | 4432 | 2544 | 6 | 68.5 | Comparative example |
| 1-7 | B3 | a | 1 | 22 | 26 | 19 | 0.318 | 154 | 34 | 15 | 3 | 63.8 | Invention example |
| 1-8 | B4 | a | 1 | 1798 | 2988 | 1654 | 0.742 | 2398532 | 3021 | 1455 | 5 | 67.8 | Comparative example |
| 1-9 | C1 | a | 1 | 22 | 24 | 18 | 0.273 | 132 | 29 | 16 | 2 | 68.9 | Invention example |
| 1-10 | C2 | a | 1 | 3642 | 3988 | 3222 | 0.210 | 2789772 | 4021 | 3001 | 7 | 74.2 | Comparative example |
| 1-11 | C3 | a | 1 | 21 | 25 | 17 | 0.381 | 168 | 29 | 14 | 2 | 68.4 | Invention example |
| 1-12 | C4 | a | 1 | 1877 | 2888 | 1540 | 0.718 | 2530196 | 3005 | 1336 | 8 | 72.3 | Comparative example |
| 1-13 | D1 | a | 1 | 22 | 24 | 18 | 0.273 | 132 | 29 | 16 | 2 | 67.9 | Invention example |
| 1-14 | D2 | a | 1 | 3642 | 3988 | 3222 | 0.210 | 2789722 | 4021 | 3001 | 7 | 73.9 | Comparative example |
| 1-15 | D3 | a | 1 | 21 | 25 | 17 | 0.381 | 168 | 29 | 14 | 2 | 68.7 | Invention example |
| 1-16 | D4 | a | 1 | 1877 | 2888 | 1540 | 0.718 | 2530196 | 3005 | 1336 | 8 | 73.1 | Comparative example |
| 1-17 | A1 | b | 3 | 20 | 25 | 17 | 0.400 | 160 | 35 | 15 | 3 | 84.5 | Invention example |
| 1-18 | A2 | b | 3 | 3409 | 3943 | 2760 | 0.347 | 4032847 | 4524 | 2400 | 8 | 87.7 | Comparative example |
| 1-19 | B1 | b | 3 | 24 | 28 | 18 | 0.417 | 240 | 34 | 15 | 2 | 64.4 | Invention example |
| 1-20 | B2 | b | 3 | 3305 | 3694 | 2684 | 0.306 | 3338050 | 4432 | 2544 | 6 | 68.2 | Comparative example |
| 1-21 | C1 | c | 6 | 22 | 24 | 18 | 0.273 | 132 | 29 | 16 | 2 | 71.2 | Comparative example |
| 1-22 | C3 | c | 6 | 21 | 25 | 17 | 0.381 | 168 | 29 | 14 | 2 | 70.9 | Comparative example |
| 1-23 | D1 | d | 5 | 22 | 24 | 18 | 0.273 | 132 | 29 | 16 | 2 | 68.1 | Invention example |
| 1-24 | D3 | d | 5 | 21 | 25 | 17 | 0.381 | 168 | 29 | 14 | 2 | 68.4 | Invention example |
| 1.25 | A1 | e | 8 | 20 | 25 | 17 | 0.400 | 160 | 35 | 13 | 3 | 87.6 | Comparative example |
| 1-26 | A3 | e | 8 | 19 | 23 | 17 | 0.316 | 114 | 33 | 13 | 3 | 88.0 | Comparative example |
| 1-27 | B1 | e | 8 | 24 | 28 | 18 | 0.417 | 240 | 34 | 13 | 3 | 66.8 | Comparative example |
| 1-28 | B3 | e | 8 | 22 | 26 | 19 | 0.318 | 154 | 34 | 15 | 3 | 66.5 | Comparative example |
| 1-29 | C1 | f | 30 | 22 | 24 | 18 | 0.273 | 132 | 29 | 16 | 2 | 73.6 | Comparative example |

TABLE 5-continued

| Test No. | Steel sheet No. | Core. No. | r mm | Tave nm | To nm | Tu nm | (To-Tu)/ Tave | Tave(To-Tu) nm² | Tmax nm | Tmin nm | N | Loss W | Remarks |
|---|---|---|---|---|---|---|---|---|---|---|---|---|---|
| 1-30 | C3 | f | 30 | 21 | 25 | 17 | 0.381 | 168 | 29 | 14 | 2 | 74.1 | Comparative example |
| 1-31 | D1 | f | 30 | 22 | 24 | 18 | 0.273 | 132 | 29 | 16 | 2 | 73.6 | Comparative example |
| 1-32 | D3 | f | 30 | 21 | 25 | 17 | 0.381 | 168 | 29 | 14 | 2 | 73.8 | Comparative example |
| 1-33 | A1 | g | 2 | 20 | 25 | 17 | 0.400 | 160 | 35 | 13 | 3 | 150.4 | Invention example |
| 1-34 | A3 | g | 2 | 19 | 23 | 17 | 0.316 | 114 | 33 | 13 | 3 | 154.5 | Invention example |
| 1-35 | B1 | g | 2 | 24 | 28 | 18 | 0.417 | 240 | 34 | 15 | 2 | 138.4 | Invention example |
| 1-36 | B3 | g | 2 | 22 | 26 | 19 | 0.318 | 154 | 34 | 15 | 3 | 139.6 | Invention example |
| 1-37 | A1 | h | 6 | 20 | 25 | 17 | 0.400 | 160 | 35 | 13 | 3 | 168.7 | Comparative example |
| 1-38 | A3 | h | 6 | 19 | 23 | 17 | 0.316 | 114 | 33 | 13 | 3 | 170.4 | Comparative example |
| 1-39 | B1 | h | 6 | 24 | 28 | 18 | 0.417 | 240 | 34 | 15 | 2 | 145.9 | Comparative example |
| 1-40 | B3 | h | 6 | 22 | 26 | 19 | 0.318 | 154 | 34 | 15 | 3 | 154.1 | Comparative example |

It became clear from the above results that the wound cores of the present invention are highly efficient because at least one of two or more bent portions 5 existing in at least one corner portion 3 satisfies Equations (1) to (3) above.

INDUSTRIAL APPLICABILITY

According to the present invention, it is possible to effectively minimize inadvertent deterioration in efficiency in a wound core formed by laminating bent steel sheets.

BRIEF DESCRIPTION OF THE REFERENCE SYMBOLS

1 Grain-oriented electrical steel sheet
2 Laminated structure
3 Corner portion
4 First planar portion
4a Second planar portion
5 Bent portion
6 Joining part
10 Wound core main body

The invention claimed is:

1. A wound core comprising: a substantially rectangular wound core main body in a side view,
wherein the wound core main body includes a portion in which grain-oriented electrical steel sheets in which first planar portions and corner portions are alternately continuous in a longitudinal direction and an angle formed by two first planar portions adjacent to each other with each of the corner portions therebetween is 90° are stacked in a sheet thickness direction and has a substantially rectangular laminated structure in a side view,
wherein each of the corner portions has two or more bent portions having a curved shape in a side view of the grain-oriented electrical steel sheets and a second planar portion between the adjacent bent portions, and the sum of bent angles of the bent portions existing in one corner portion is 90°,
wherein each bent portion in a side view has an inner side radius of curvature r of 1 mm to 5 mm,
wherein the grain-oriented electrical steel sheets have a chemical composition containing, in mass %,
Si: 2.0% to 7.0%, with the remainder comprising Fe and impurities, and
have a texture oriented in the Goss orientation, and
wherein at least one of two or more bent portions existing in at least one corner portion satisfies Equations (1) to (3) below, $$Tave \leq 40 \text{ nm} \tag{1}$$

$$(To-Tu)/Tave \leq 0.50 \tag{2}$$

$$Tave(To-Tu) \leq 240 \text{ nm}^2 \tag{3}$$

here, a thickness T (nm) of an intermediate layer provided on a surface of a base steel sheet of the grain-oriented electrical steel sheets is measured at multiple sites of the first and second planar portion regions adjacent to the bent portions, an average thickness of the thickness T (nm) of the intermediate layer is regarded as Tave (nm), a maximum thickness is regarded as Tmax (nm), a minimum thickness is regarded as Tmin (nm), an average value of data where T>Tave is regarded as To (nm), and an average value of data where T<Tave is regarded as Tu (nm).

2. The wound core according to claim 1,
wherein at least one of two or more bent portions existing in at least one corner portion satisfies Equation (4) below, $$N(To-Tu) \leq 24 \text{ nm} \tag{4}$$

here, in a thickness distribution of the intermediate layer along a surface direction of the steel sheets, a region where measurement values where T>Tave are continuous is counted as one region, and the number of these regions within the entire measurement region is defined as N.

3. The wound core according to claim 2,
wherein at least one of two or more bent portions existing in at least one corner portion satisfies Equation (5) below, $$N \geq 2 \quad (5).$$

4. The wound core according to claim 1,
wherein at least one of two or more bent portions existing in at least one corner portion satisfies Equation (6) below, $$(T\mathrm{max} - T\mathrm{min}) < T\mathrm{ave} \quad (6).$$

* * * * *